(12) United States Patent
Tanaka et al.

(10) Patent No.: US 9,982,759 B2
(45) Date of Patent: May 29, 2018

(54) HYDRAULIC AUTO-TENSIONER

(71) Applicants: Tadahisa Tanaka, Shizuoka (JP);
Satoshi Kitano, Shizuoka (JP);
Takehiro Takano, Shizuoka (JP)

(72) Inventors: Tadahisa Tanaka, Shizuoka (JP);
Satoshi Kitano, Shizuoka (JP);
Takehiro Takano, Shizuoka (JP)

(73) Assignee: NTN CORPORATION, Osaka (JP)

( * ) Notice: Subject to any disclaimer, the term of this patent is extended or adjusted under 35 U.S.C. 154(b) by 866 days.

(21) Appl. No.: 14/370,067

(22) PCT Filed: Dec. 21, 2012

(86) PCT No.: PCT/JP2012/083243
§ 371 (c)(1),
(2) Date: Jul. 1, 2014

(87) PCT Pub. No.: WO2013/103098
PCT Pub. Date: Jul. 11, 2013

(65) Prior Publication Data
US 2014/0378253 A1 Dec. 25, 2014

(30) Foreign Application Priority Data

Jan. 6, 2012 (JP) .................................. 2012-001256
Jan. 25, 2012 (JP) .................................. 2012-012895

(51) Int. Cl.
*F16H 7/08* (2006.01)
*F16H 7/12* (2006.01)

(52) U.S. Cl.
CPC ............. *F16H 7/08* (2013.01); *F16H 7/1236* (2013.01); *F16H 2007/0806* (2013.01);
(Continued)

(58) Field of Classification Search
CPC ......................................................... F16H 7/08
(Continued)

(56) References Cited

U.S. PATENT DOCUMENTS 6,352,487 B1 * 3/2002 Tada ......................... F01L 1/02
474/110
7,241,239 B2 * 7/2007 Tanaka .................. F16H 7/0836
474/101
(Continued)

FOREIGN PATENT DOCUMENTS

FR 2 948 742 2/2011
JP 2003-287092 10/2003
(Continued)

OTHER PUBLICATIONS

International Search Report dated Feb. 12, 2013 in International (PCT) Application No. PCT/JP2012/083243.
(Continued)

*Primary Examiner* — William E Dondero
*Assistant Examiner* — Mark K Buse
(74) *Attorney, Agent, or Firm* — Wenderoth, Lind & Ponack, L.L.P.

(57) ABSTRACT

A hydraulic auto-tensioner includes a sleeve having its bottom end press-fitted in a sleeve fitting hole in the bottom surface of a cylinder, a rod having its bottom end slidably fitted in the sleeve, and a return spring mounted between a spring support at the upper portion of the rod and the bottom surface of the cylinder. A pressure chamber communicates with a reservoir chamber through a passage formed between fitting surfaces of the sleeve fitting hole and the sleeve. The passage has a check valve. The rod has a valve fitting hole and a communication passage through which the valve fitting hole communicates with the reservoir chamber. The valve fitting hole has a relief valve. An orifice is formed
(Continued)

between a valve hole formed in a valve seat of the relief valve and a valve body to prevent a sharp drop in pressure in the pressure chamber.

15 Claims, 10 Drawing Sheets

(52) U.S. Cl.
CPC ............... *F16H 2007/0814* (2013.01); *F16H 2007/0859* (2013.01); *F16H 2007/0893* (2013.01)

(58) Field of Classification Search
USPC ........................................................ 474/110
See application file for complete search history.

(56) References Cited

U.S. PATENT DOCUMENTS

| | | | |
|---|---|---|---|
| 7,618,339 B2* | 11/2009 | Hashimoto | F01L 1/02 474/109 |
| 2003/0216202 A1 | 11/2003 | Emizu et al. | |
| 2004/0087398 A1 | 5/2004 | Tanaka | |
| 2005/0064970 A1* | 3/2005 | Tanaka | F16H 7/0836 474/110 |
| 2006/0089221 A1* | 4/2006 | Hashimoto | F01L 1/02 474/110 |
| 2012/0202628 A1* | 8/2012 | Six | F16H 7/1236 474/110 |
| 2014/0057748 A1* | 2/2014 | Satomura | F16H 7/1236 474/110 |
| 2015/0252878 A1* | 9/2015 | Kitano | F16H 7/0836 474/101 |

FOREIGN PATENT DOCUMENTS

| | | |
|---|---|---|
| JP | 2005-299751 | 10/2005 |
| JP | 2006-046394 | 2/2006 |
| JP | 2008-180265 | 8/2008 |
| JP | 2009-121527 | 6/2009 |
| JP | 2009-264419 | 11/2009 |
| JP | 2010-276152 | 12/2010 |
| JP | 2011-027238 | 2/2011 |

OTHER PUBLICATIONS

Written Opinion of the International Searching Authority dated Feb. 12, 2013 in International (PCT) Application No. PCT/JP2012/083243 (with English translation).
European Search Report dated Mar. 9, 2015 in European (EP) Application No. 12864470.5.

* cited by examiner

HYDRAULIC AUTO-TENSIONER

TECHNICAL FIELD

This invention relates to a hydraulic auto-tensioner used to adjust tension of a belt for driving vehicle engine accessories such as an alternator, a water pump, and the compressor of an air-conditioner.

BACKGROUND ART

Figure 13:
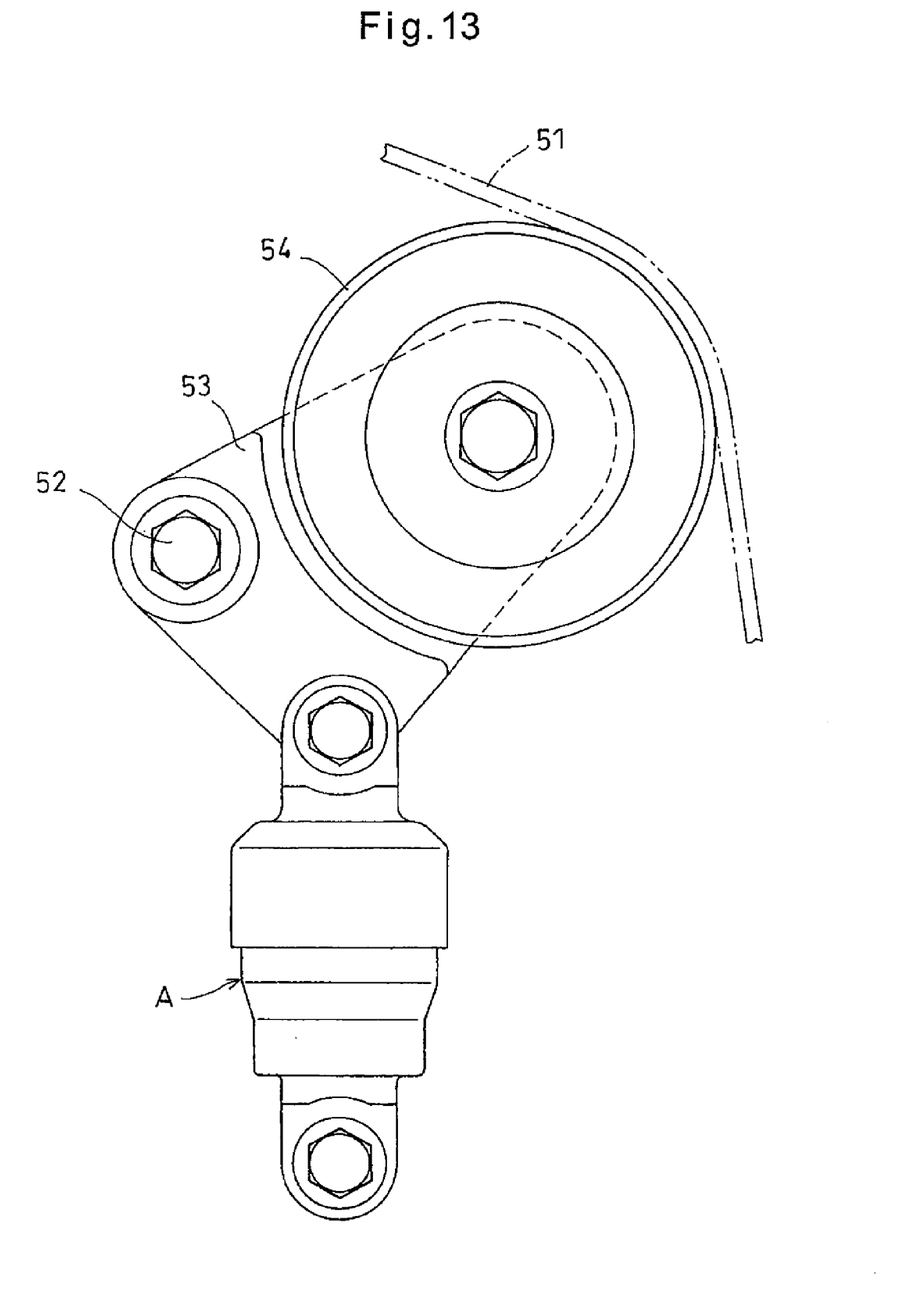
FIG. 13 is a front view of a tension adjusting device for an engine accessory driving belt.

A belt transmission device is used to transmit the rotation of an engine crankshaft to various vehicle engine accessories. Such a belt transmission device is shown in FIG. 13, which includes a pulley arm 53 provided at a slack side of a belt 51 so as to be pivotable about a pivot shaft 52. The pulley arm 53 rotatably carries a tension pulley 54 at its end remote from the pivot shaft 52. The above-mentioned hydraulic auto-tensioner A is arranged to apply an adjusting force to the pulley arm 53 to bias the pulley arm 53 in the direction in which the tension pulley 54 is pressed against the belt 51, thereby keeping constant the tension of the belt 51.

One hydraulic auto-tensioner A used in such belt transmission devices includes a sleeve, and a rod slidably inserted in the sleeve to define a pressure chamber in the sleeve. The hydraulic auto-tensioner is configured such that when a pushing force is applied from the belt 51 to the rod, hydraulic oil in the pressure chamber flows through a minute gap defined between the radially inner surface of the sleeve and the radially outer surface of the rod, thereby generating a hydraulic damping force in the pressure chamber, which dampens the pushing force.

The hydraulic damping force generated in this hydraulic auto-tensioner is substantially proportional to the pushing force. That is, the hydraulic damping force increases as the pushing force increases.

This auto-tensioner is therefore incapable of preventing over-tensioning of the belt, and could reduce the durability of the belt.

JP Patent Publication 2011-27238A proposes a hydraulic auto-tensioner which is free of this problem. In this auto-tensioner, a relief valve is mounted in a valve fitting hole formed in the lower end portion of the rod, with the pressure chamber communicating with the reservoir chamber through the valve fitting hole and a communication passage formed in the rod. With this arrangement, if the pressure in the pressure chamber exceeds the set pressure of the relief valve, the relief valve is adapted to open, releasing hydraulic oil in the pressure chamber into the reservoir chamber through the communication passage, thereby preventing over-tensioning of the belt.

In the hydraulic auto-tensioner disclosed in JP Patent Publication 2011-27238A, when the relief valve opens, hydraulic oil in the pressure chamber is instantly released into the reservoir chamber, so that the pressure in the pressure chamber drops sharply, which could cause separation of air dissolved in hydraulic oil. The separated air remains in the pressure chamber, and will be compressed when pushing force is applied to the hydraulic auto-tensioner, thus deteriorating the hydraulic damping function.

The relief valve of this hydraulic auto-tensioner includes a valve seat press-fitted in the valve fitting hole, a valve body for opening and closing a valve hole formed in the valve seat, a valve spring biasing the valve body toward the closed position, and a spring seat mounted between the valve spring and the valve body and having a shaft portion protruding from the top surface thereof. The valve fitting hole has a top wall which restricts the moving distance of the spring seat by abutting the shaft portion, thereby restricting the degree of opening of the relief valve. Thus, the top end surface of the shaft portion tends to become worn or may be deformed by repeatedly abutting the top wall of the valve fitting hole. The thus worn or deformed top end surface of the shaft portion may close the opening of the communication passage. For this reason, the relief valve of this auto-tensioner is not sufficiently reliable.

Since the shaft portion is small in diameter, it is difficult, and thus costly, to form the shaft portion.

SUMMARY OF THE INVENTION

An object of the present invention is to provide a hydraulic auto-tensioner which is free of deterioration in hydraulic damping function and which can sufficiently quickly generate hydraulic damping force.

Another object of the present invention is to provide a hydraulic auto-tensioner having a relief valve which can reliably perform its expected function.

In order to achieve the above-noted objects, the present invention provides a hydraulic auto-tensioner comprising a cylinder containing hydraulic oil and having an inner bottom surface formed with a sleeve fitting hole, a sleeve having a bottom end portion fitted in the sleeve fitting hole, a rod having a bottom end portion slidably inserted in the sleeve, thereby defining a pressure chamber in the sleeve, a spring support provided at an upper portion of the rod, and a return spring mounted between the spring support and the inner bottom surface of the cylinder and biasing the cylinder and the rod in the direction in which the rod protrudes from the cylinder. A reservoir chamber having a top opening is defined between the cylinder and the sleeve, with the top opening of the reservoir chamber closed. A passage is defined between fitting surfaces of the sleeve and the sleeve fitting hole such that the reservoir chamber communicates with the pressure chamber through the passage, and a check valve is mounted in the passage and configured to close the passage when the pressure in the pressure chamber exceeds the pressure in the reservoir chamber. The rod is formed with a valve fitting hole having an opening at a bottom end surface of the rod, and a communication passage through which an upper portion of the valve fitting hole communicates with the reservoir chamber. A relief valve is mounted in the valve fitting hole and configured to be opened if the pressure in the pressure chamber exceeds a set pressure, thereby releasing the pressure in the pressure chamber into the reservoir chamber through the communication passage formed in the rod. The relief valve comprises a valve seat press-fitted in the valve fitting hole and formed with a valve hole, a spherical valve body which opens and closes the valve hole from inside the valve fitting hole, and a valve spring biasing the valve body toward the valve hole. The valve seat is formed with an orifice disposed between the valve hole and a seating surface formed on an upper portion of the valve seat such that the valve body can be seated on the seating surface, and configured to restrict the amount of oil that passes through the valve hole.

By providing the orifice in the hydraulic oil flow passage extending from the pressure chamber to the valve body of the relief valve, the orifice restricts the amount of oil that passes through the hydraulic oil flow passage when the relief valve opens. This prevents a sharp drop in pressure in the pressure chamber, thus preventing deterioration in hydraulic damping function.

If the orifice is formed at the end of the valve hole facing the pressure chamber, due to a large difference in diameter between the orifice and the radially inner surface of the valve hole, the orifice and the valve hole forms a stepped hole, so that a relatively large space forms between the valve body and the orifice. This large space functions as an oil reservoir. When the valve body is moved to the open position, the pressure in the space as an oil reservoir, which is relatively large in volume, drops sharply. As a result, air dissolved in hydraulic oil in this space may separate from the oil, and the separated air may remain in the valve hole.

The air remaining in the valve hole will be eventually pushed out of the valve hole by hydraulic oil fed into the valve hole through the orifice. But since hydraulic oil has to pass through the narrow orifice before being fed into the valve hole, it takes a long time until the valve hole is filled with hydraulic oil. If pushing force is applied to the hydraulic auto-tensioner before the valve hole is filled with hydraulic oil, air remaining in the valve is compressed, which could delay the generation of hydraulic damping force.

But according to the present invention, since the orifice is formed between the valve hole and the seating surface on which the valve body is seated, the space defined under the valve body is small compared to the arrangement in which the orifice is formed at the bottom end of the valve hole. With this arrangement, even if air separates from the hydraulic oil in this space due to a sharp drop in pressure in this space when the valve body is moved to the open position, the thus separated air is instantly pushed out of this space by hydraulic oil fed into the space through the orifice, so that the space is instantly filled with hydraulic oil, and thus the hydraulic damping force is generated without delay.

The seating surface formed on the valve seat may be a tapered surface. The contact portion of the tapered surface to be brought into contact with the valve body may be a curved portion having a convex curved section. Alternatively, the seating surface may have a convex circular arc-shaped section.

If the seating surface is a tapered surface, and if the tapered surface is inclined at an angle of less than 25° relative to the axis of the seating surface, the valve body could wedge into the seating surface when the valve body is moved to the closed position and get stuck. If this inclination angle is larger than 85°, a long time is needed until the valve body moves from the open position to the closed position and stabilizes at this position. Thus, this inclination angle is preferably within the range of 25° to 85°.

If the contact portion of the tapered surface is a curved portion having a convex curved section, and if the curved portion has a radius of curvature of less than 1 mm, the valve body cannot be seated on such a seating surface in a stable manner. If over 7.0 mm, the contact pressure of the valve body tends to be too high. Thus, the curved portion preferably has a radius of curvature within the range of 1 mm to 7 mm.

If the seating surface has a convex circular arc-shaped section, and if the convex circular arc-shaped section has a radius of curvature larger than 1 mm, the valve body tends to get stuck on the seating surface. Thus preferably, the convex circular arc-shaped section has a radius of curvature of 1 mm or less.

If the seating surface is a tapered surface, the inner surface of the valve hole is preferably shaped so as to form a vertical mirror image of the seating surface. With this arrangement, the valve seat can be fitted into the valve fitting hole either such that the seating surface serves as the seating surface, or such that the inner surface of the valve hole serves as the seating surface. Thus, the relief valve can be assembled more easily.

If the inner diameter d of the orifice is smaller than 5% of the outer diameter D of the valve body, the oil flow rate through the orifice tends to be so low that it is difficult to sufficiently quickly reduce the pressure in the pressure chamber. If the inner diameter d is larger than 25% of the outer diameter D, the oil flow rate through the orifice tends to be so high that the pressure in the pressure chamber drops too sharply. Thus, the orifice inner diameter d is preferably determined within the range of d=0.05 D to 0.25 D.

In order to achieve the second object, the present invention provides a hydraulic auto-tensioner of the above type wherein the valve fitting hole has a large-diameter hole portion at the bottom end portion thereof, and the valve seat is press-fitted in the large-diameter hole portion. The relief valve further comprises a spring seat mounted in the large-diameter hole portion so as to be slidable along the radially inner surface of the large-diameter hole portion, and a shoulder is formed at the top end of the large-diameter hole portion. The shoulder and the spring seat are arranged such that the shoulder restricts the movement of the spring seat by abutting the spring seat, whereby the spring seat restricts the movement of the valve body, thereby restricting the degree of opening of the relief valve. The spring seat is formed with an oil passage through which oil can flow from the bottom surface to the top surface, of the spring seat.

With this arrangement, in which the spring seat is mounted between the valve body and the valve spring, and the movement of the valve body and thus the degree of opening of the relief valve are restricted by bringing the spring seat into abutment with the shoulder at the top end of the large-diameter hole portion, the valve body is located far below the communication passage formed in the rod when the valve body is in the open position, i.e. when the valve body is in abutment with the shoulder. Thus, the bottom opening of the communication passage will never be closed by the valve body. This ensures accurate performance of the relief valve at all times.

In this hydraulic auto-tensioner, the spring seat preferably has on the bottom surface thereof a seating portion for the valve body. The seating portion prevents radial movement of the valve body, thus making it possible to reliably open and close the valve hole with the valve body. The seating portion may be a tapered recess or a spherical recess. The seating portion may also be a hole having a diameter smaller than that of the (spherical) valve body.

Also preferably, the spring seat has on the top surface thereof a bulge which fits in the bottom end portion of the valve spring. The bulge prevents run-out of the bottom end portion of the valve spring. This ensures that the elastic force of the valve spring is reliably applied to the spring seat in the axial direction of the spring seat, which in turn makes it possible to smoothly slide the spring seat in the axial direction at all times.

The oil passage formed in the spring seat, through which oil can flow from the bottom surface of the spring seat to the top surface of the spring seat, allows hydraulic oil in the pressure chamber to be smoothly released into the reservoir chamber. The oil passage may be a cutout formed on the outer peripheral portion of the spring seat, or a through hole, such as an elongated hole or a circular hole, extending through the spring seat from the top surface to the bottom surface, of the spring seat.

The spring seat may have a guide piece extending downwardly from the outer peripheral portion of the spring seat so as to be guided by the radially inner surface of the large-diameter hole portion. The guide piece reduces inclination of the spring seat, thus allowing the spring seat to be smoothly guided along the radially inner surface of the large-diameter hole portion.

The spring seat may be formed by pressing a metal plate, or made of a resin.

If the spring seat is formed by pressing a metal plate, the spring seat may have a plurality of retaining pieces downwardly bent by more than 90° such that distal ends of the retaining pieces face the spherical outer surface of the valve body with a minute gap left therebetween. The retaining pieces prevent radial movement of the valve body, making it possible to open the valve hole with high accuracy with the valve body.

If the spring seat is formed by pressing a metal plate, the spring seat is preferably subjected to surface hardening treatment such as soft nitriding treatment or carbonitriding treatment to increase the hardness of the spring seat, thereby improving its durability.

Advantages of the Invention

According to the present invention, the orifice provided between the valve hole formed in the valve seat and the valve body restricts the amount of oil passing through the relief valve when the relief valve is opened, thus preventing a sharp drop in pressure in the pressure chamber. This in turn prevents deterioration in a hydraulic damping function.

By forming the orifice between the valve body and the seating surface on which the valve body is to be seated, it is possible to minimize the space defined between the valve body and the orifice. Thus, even if air separates from the hydraulic oil in this space due to a sharp drop in pressure in this space when the valve body is moved to the open position, since this space is extremely small in volume, air can be instantly pushed out of this space by hydraulic oil fed into this space through the orifice, so that the space is instantly filled with hydraulic oil, and thus the hydraulic damping force is generated without delay. This prevents flapping of the belt.

DETAILED DESCRIPTION OF THE INVENTION

Figure 1:
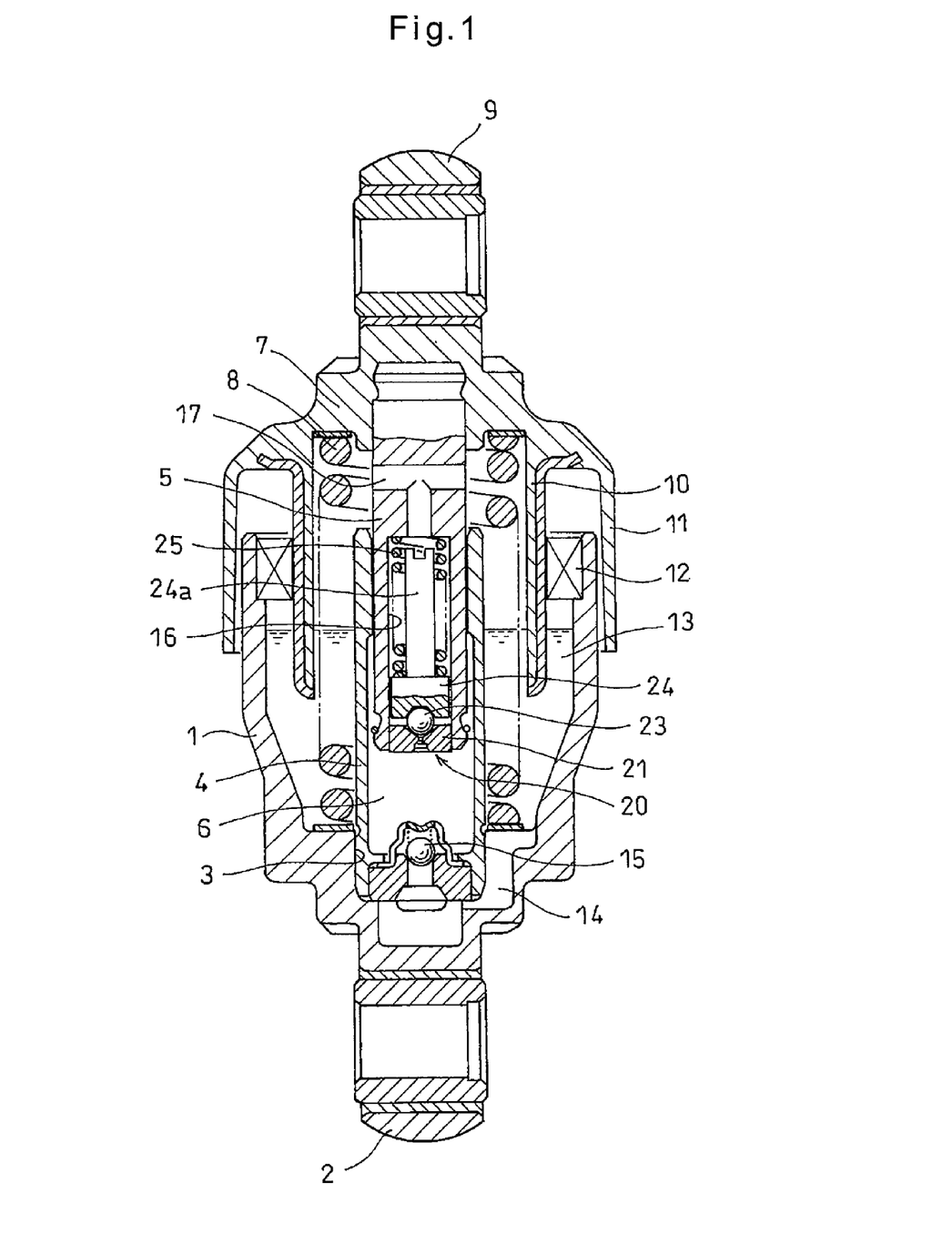
FIG. 1 is a vertical sectional front view of a hydraulic auto-tensioner embodying the present invention.

Now the embodiment of the present invention is described with reference to the drawings. As shown in FIG. 1, the auto-tensioner of the embodiment includes a cylinder 1 having a closed bottom, and a coupling piece 2 provided at the closed bottom end of the cylinder 1 and adapted to be rotatably coupled to an engine block.

A sleeve fitting hole 3 is formed in the bottom surface of the cylinder 1. A sleeve 4 has its bottom end portion press-fitted in the sleeve fitting hole 3. A rod 5 has its lower portion slidably inserted in the sleeve 4, defining a pressure chamber 6 in the sleeve 4.

A spring support 7 is fixed to the top end of the rod 5, which is located outside of the cylinder 1. A return spring 8 is mounted between the spring support 7 and the bottom surface of the cylinder 1 to bias the cylinder 1 and the rod 5 in the direction in which the rod 5 protrudes from the cylinder 1.

A coupling piece 9 is provided at the top end of the spring support 7. The coupling piece 9 is configured to be coupled to a pulley arm 53 shown in FIG. 13. The spring support 7 includes an inner tubular portion 10 covering the upper portion of the return spring 8, and an outer tubular portion 11 covering the outer periphery of the upper portion of the cylinder 1 and coaxial with the inner tubular portion 10.

An elastic seal 12 such as an oil seal is mounted in the cylinder 1 near the top opening of the cylinder 1. The elastic seal 12 has its inner periphery kept in elastic contact with the outer peripheral surface of the inner tubular portion 10, thereby closing the top opening of the cylinder 1 and preventing leakage of hydraulic oil in the cylinder 1 to outside.

The elastic seal 12 defines a sealed reservoir chamber 13 between the cylinder 1 and the sleeve 4. The reservoir chamber 13 communicates with the pressure chamber 6 through a passage 14 defined between fitting surfaces of the sleeve fitting hole 3 and the sleeve 4. A check valve 15 is provided at the end of the passage 14 facing the pressure chamber 6, and is configured to close the passage 14 when the pressure in the pressure chamber 6 exceeds the pressure in the reservoir chamber 13.

The rod 5 is formed with a valve fitting hole 16 open at the bottom end surface of the rod 5, and a T-shaped communication passage 17 through which the top end of the valve fitting hole 16 communicates with the reservoir chamber 13. A relief valve 20 is mounted in the valve fitting hole 16.

Figure 2:
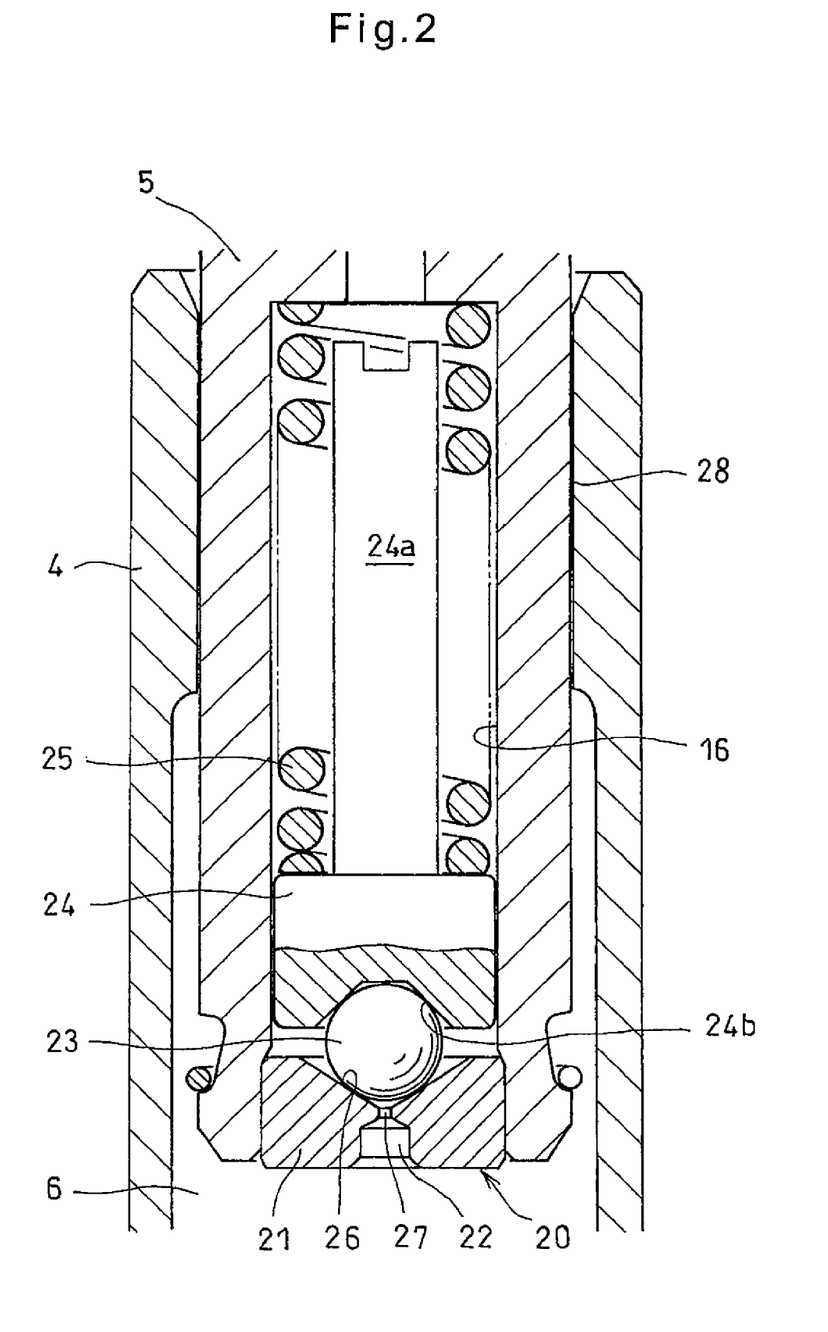
FIG. 2 is an enlarged sectional view of a portion of the auto-tensioner where a relief valve is mounted.

As shown in FIG. 2, the relief valve 20 includes a valve seat 21 press-fitted in the bottom opening of the valve fitting hole 16, a spherical valve body 23 for opening and closing a valve hole 22 formed in the valve seat 21 from inside the valve fitting hole 16, a spring seat 24 provided on top of the valve body 23, and a valve spring 25 biasing the valve body 23 toward the valve hole 22 through the spring seat 24.

Figure 3:
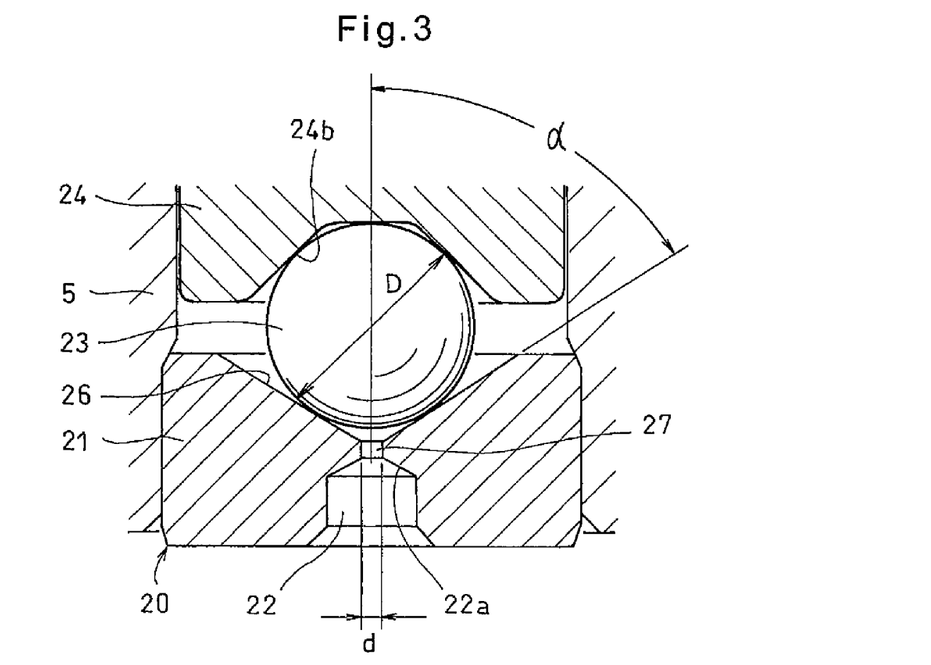
FIG. 3 is an enlarged sectional view of and around a valve seat.

As shown in FIG. 3, the valve seat 21 has on its top surface a seating surface 26 on which the valve body is adapted to be seated. The seating surface 26 is a tapered surface of which the inclination angle α relative to the axis is within the range of 25° to 85°.

The valve seat 21 further includes an orifice 27 as a restricted portion defined between the seating surface 26 and the valve hole 22. The orifice 27 has an inner diameter d which satisfies the relation d=0.05 D to 0.25 D, where D is the outer diameter of the valve body 23.

The valve hole 22 has a top end wall 22a which is tapered so that hydraulic oil flowing into the valve hole 22 from the pressure chamber 6 can smoothly flow in the valve hole 22.

The spring seat 24 is circular in shape so that the spring seat 24 can slide along the radially inner surface of the valve fitting hole 16. A gap is defined between the sliding surfaces of the spring seat 24 and the valve fitting hole 16.

A rod 24a (see FIG. 2) is integrally formed on the top surface of the spring seat 24 so as to be located inside of the valve spring 25. The bottom surface of the spring seat 24 has a conical seating portion 24b in which the upper portion of the valve body 23 is adapted to be fitted.

The set pressure of the relief valve 20 is equal to the spring force of the valve spring 25. That is, if the pressure in the pressure chamber 6 exceeds the spring force of the valve spring 25, the valve hole 22 is opened by the valve body 23.

When the hydraulic auto-tensioner of this embodiment is used to adjust the tension of an engine accessory driving belt 51 shown in FIG. 13, the coupling piece 2, which is provided on the closed end of the cylinder 1, is coupled to the engine block, while the coupling piece 9 of the spring support 7 is coupled to the pulley arm 53 to apply its adjusting force to a pulley arm 53.

While the tension of the belt 51 is being adjusted by the auto-tensioner, the tension of the belt 51 fluctuates due e.g. to fluctuations in load applied to engine accessories. When the tension of the belt 51 decreases, the cylinder 1 and the rod 5 are moved relative to each other in the direction in which the rod 5 protrudes from the cylinder 1, under the biasing force of the return spring 8, thus eliminating slackness of the belt 51.

When the cylinder 1 and the rod 5 move relative to each other in the direction in which the rod 5 protrudes from the cylinder 1, the pressure in the pressure chamber 6 drops below the pressure in the reservoir chamber 13, so that the passage 14 is opened by the check valve 15. Hydraulic oil in the reservoir chamber 13 thus flows smoothly through the passage 14 into the pressure chamber 6, allowing the cylinder 1 and the rod 5 to smoothly move relative to each other in the direction in which the rod 5 protrudes from the cylinder 1, thus instantly taking up the slack of the belt 51.

When the tension of the belt 51 increases, a pushing force is applied from the belt 51 to the hydraulic auto-tensioner that tends to push the rod 5 into the cylinder 1. The pressure in the pressure chamber 6 thus exceeds the pressure in the reservoir chamber 13, so that the passage 14 is closed by the check valve 15.

Figure 7:
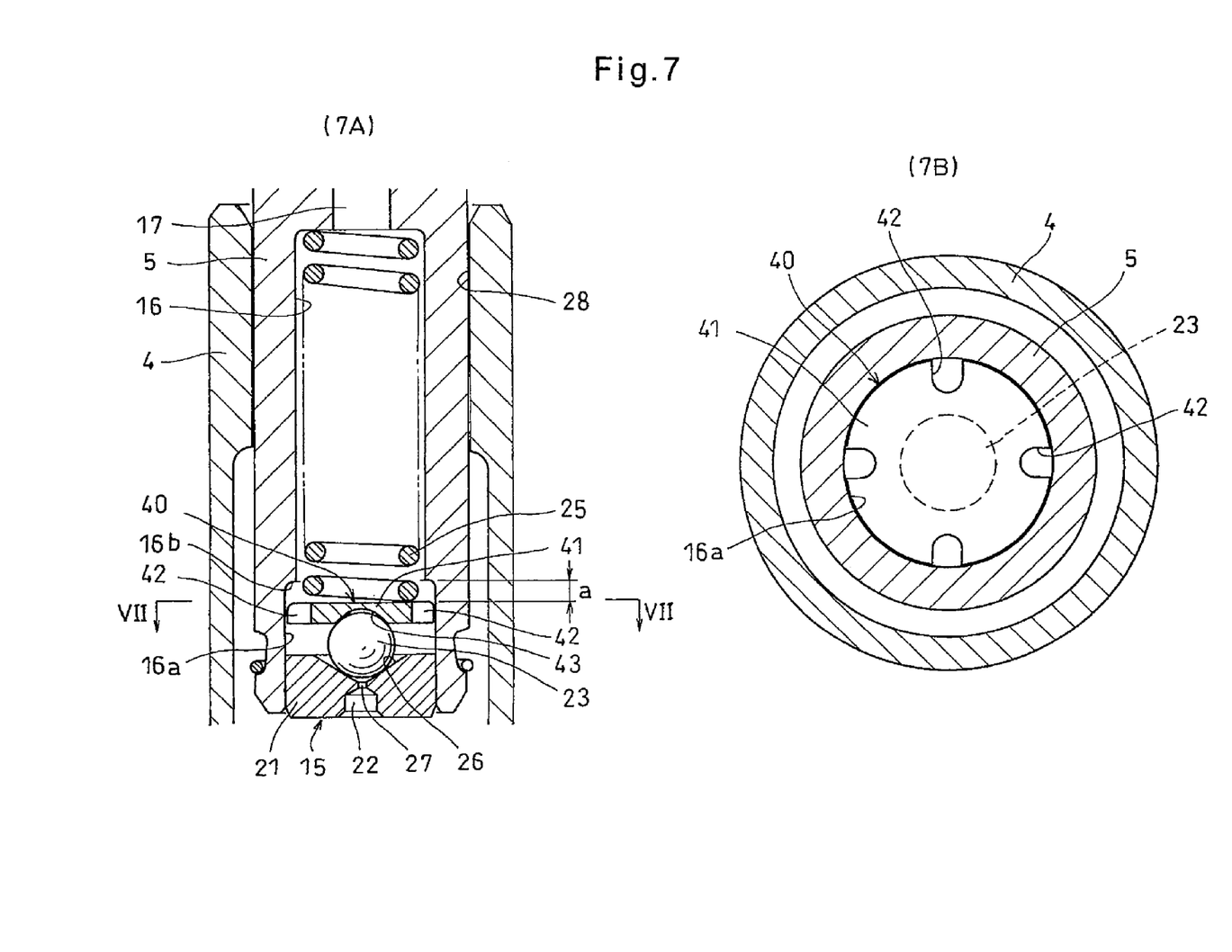
FIG. 7A is a sectional view of a different relief valve.
FIG. 7B is a sectional view taken along line VII-VII of FIG. 7A.
Figure 8:
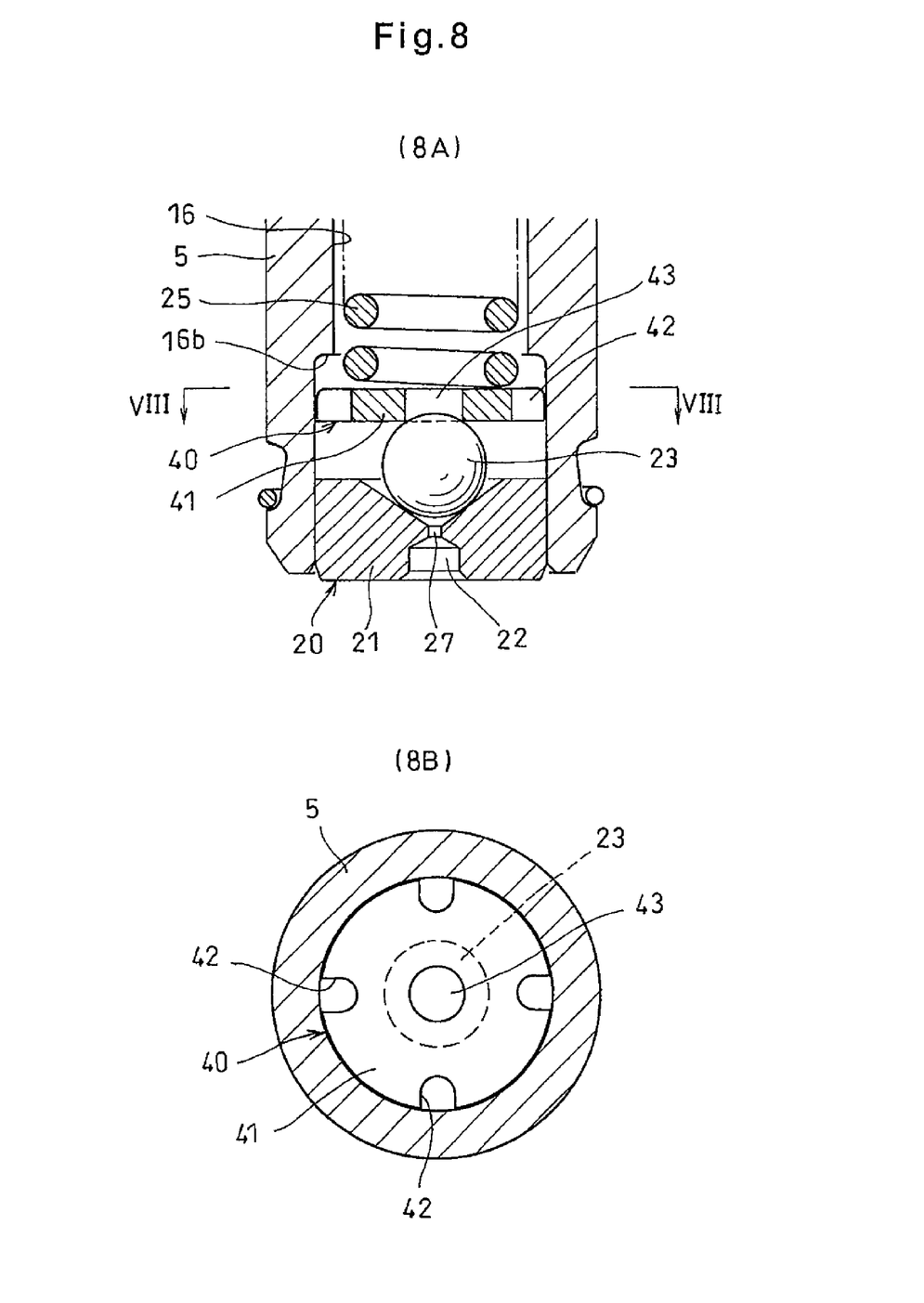
FIG. 8A is a sectional view of and around a different spring seat of the relief valve.
FIG. 8B is a sectional view taken along line VIII-VIII of FIG. 8A.
Figure 9:
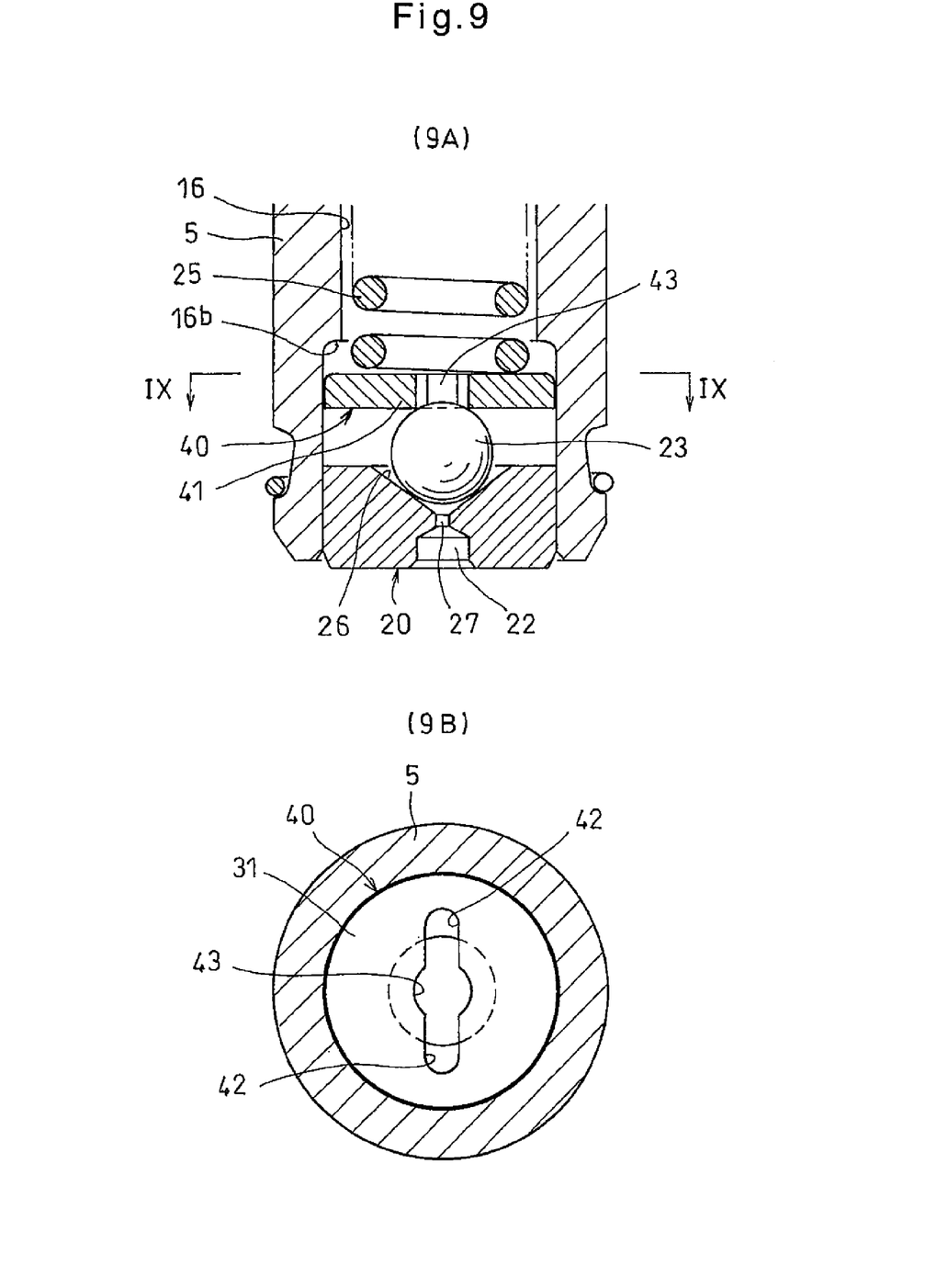
FIG. 9A is a sectional view of and around a still different spring seat of the relief valve.
FIG. 9B is a sectional view taken along line IX-IX of FIG. 9A.

In this state, hydraulic oil in the pressure chamber 6 flows through a minute gap 28 (see FIG. 7) defined between the radially inner surface of the sleeve 4 and the radially outer surface of the rod 5 and flows into the reservoir chamber 13. Due to viscous resistance of hydraulic oil flowing through the minute gap 28, hydraulic damping force is generated in the pressure chamber 6. The hydraulic damping force dampens the pushing force applied to the auto-tensioner, thus allowing the cylinder 1 and the rod 5 to slowly move relative to each other in the direction in which the rod 5 is retracted into the cylinder 1 until the pushing force balances with the elastic force of the return spring 8.

If the tension of the belt 51 increases until the pressure in the pressure chamber 6 exceeds the set pressure of the relief valve 20, the relief valve 20 opens. This allows hydraulic oil in the pressure chamber 6 to be released into the reservoir chamber 13 through the communication passage 17 until the pressure in the pressure chamber 6 does not exceed the set pressure of the relief valve 20.

When the relief valve 20 opens and hydraulic oil in the pressure chamber 6 is instantly released into the reservoir chamber 13, the pressure in the pressure chamber 6 drops sharply. This deteriorates hydraulic damping function. But in this embodiment, the orifice 27 formed at the top end of the valve hole 22 restricts the amount of hydraulic oil that passes through the orifice 27, thus preventing a sharp drop in pressure in the pressure chamber 6. This in turn prevents separation of air in the pressure chamber 6, and thus deterioration in hydraulic damper function. The hydraulic auto-tensioner according to the present invention can thus always operate with high accuracy.

Since the orifice 27 is arranged between the valve hole 22 and the seating surface 26, which is formed on the top surface of the valve seat 21 and on which the valve body 23 is configured to be seated, the gap formed under the valve body 23 is smaller than in the arrangement in which the orifice 27 is formed at the bottom end of the valve hole 22. Thus, even if air separates from hydraulic oil in this space due to a sharp drop in pressure in this space when the valve body 23 is moved to the open position, such air can be instantly pushed out of this space by hydraulic oil fed through the orifice 27, so that the space is instantly filled with hydraulic oil.

Thus, as soon as pushing force is applied to the hydraulic auto-tensioner according to the present invention, hydraulic damping function is instantly activated without the least delay.

Figure 4:
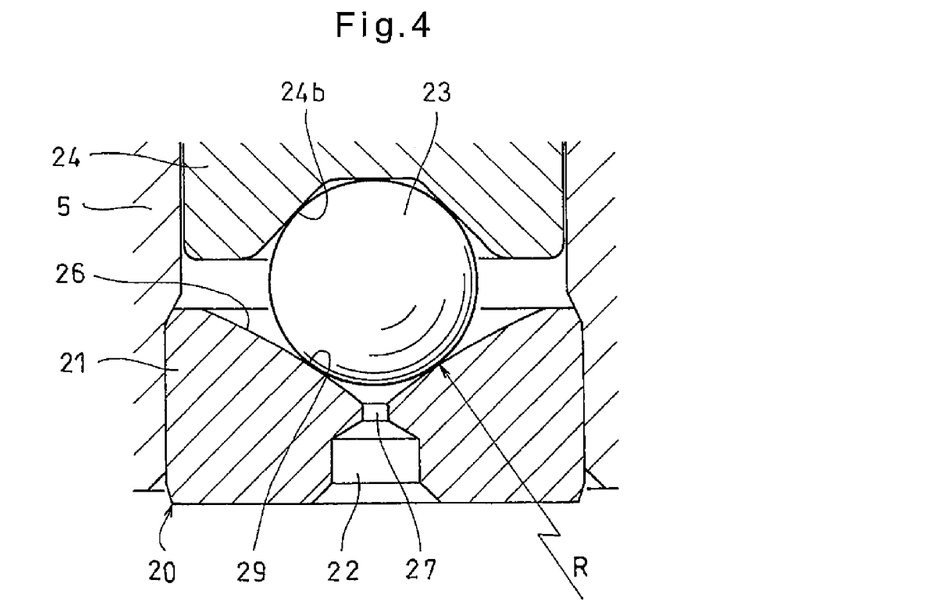
FIG. 4 is an enlarged sectional view of and around a different valve seat.
Figure 5:
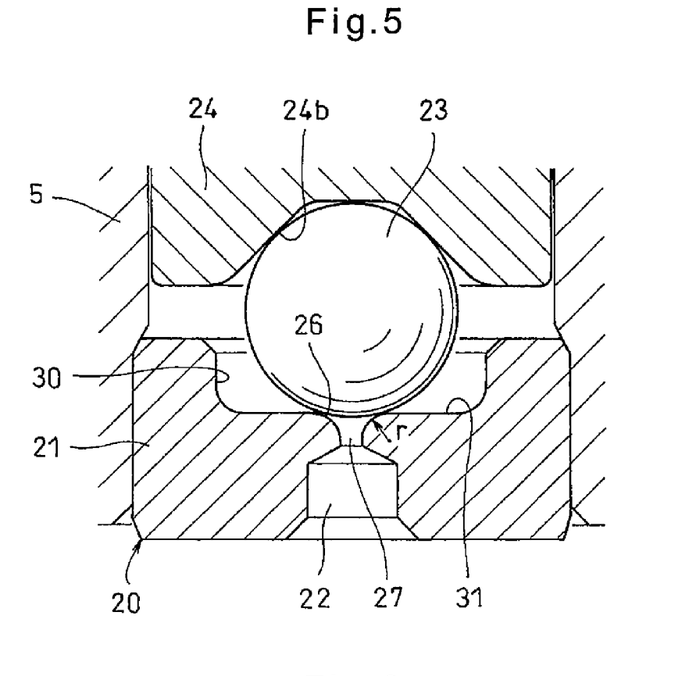
FIG. 5 is an enlarged sectional view of and around a still different valve seat.
Figure 6:
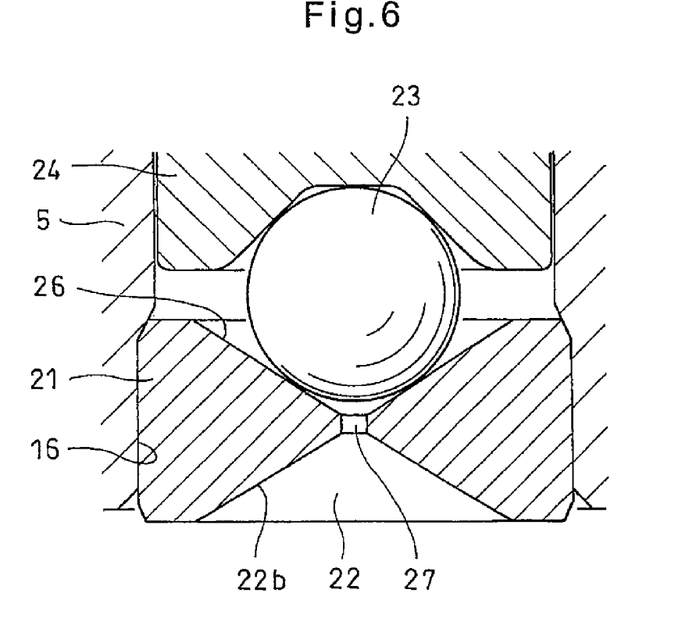
FIG. 6 is an enlarged sectional view of and around a further different valve seat.

FIGS. 4 to 6 show different valve seats 21. The valve seat 21 shown in FIG. 4 differs from the valve seat 21 shown in FIG. 3 in that the portion of seating surface 26 to be brought into contact with the valve body forms a curved portion 29 having a convex curved section with a radius of curvature R of 1 to 7 mm. Portions or elements corresponding to those of FIG. 3 are indicated by identical numerals, and their description is omitted.

The curved portion 29 of FIG. 4 makes it possible for the valve body to be seated more stably.

The valve seat 21 shown in FIG. 5 is formed with a circular recess 30 on the top surface thereof, with the seating surface 26 formed along the boundary between the bottom surface 31 of the circular recess 30 and the radially inner surface of the orifice 27. The seating surface 26 has circular arc-shaped section with a radius of curvature r of not more than 1 mm. This valve seat is otherwise identical in structure to the valve seat 21 shown in FIG. 3. Thus, portions and elements corresponding to those of FIG. 3 are indicated by identical numerals, and their description is omitted.

The seating surface 26 of FIG. 5, which has a circular arc-shaped section with a radius of curvature r of not more than 1 mm, prevents the valve body from getting stuck on the seating surface 26.

In the valve seat 21 shown in FIG. 6, the valve hole 22 has tapered inner surface 22b which is a vertical mirror image of the seating surface 26. This valve seat is otherwise identical in structure to the valve seat 21 shown in FIG. 3. Thus, portions and elements corresponding to those of FIG. 3 are indicated by identical numerals, and their description is omitted.

Since the inner surface 22b of the valve hole 22 is a mirror image of the seating surface 26, the valve seat 21 can be press-fitted into the valve fitting hole 16 either such that the surface 26 serves as the seating surface, or such that the surface 22b serves as the seating surface. Thus, the relief valve 20 can be assembled more easily.

FIGS. 7A and 7B show a different relief valve 20. In this embodiment, the orifice 27 of the valve seat 21 still satisfies the relationship d=0.05 D to 0.25 D, as discussed above with respect to FIG. 3. In this relief valve 20, however, the valve seat 21 is press-fitted in a lower large-diameter hole portion 16a of the valve fitting hole 16, a valve body 23 for opening and closing a valve hole 22 formed in the valve seat 21 from inside the valve fitting hole 16, and a restricting member 40 for restricting the degree of opening of the valve by restricting the moving distance of the valve body 23 within the range of 0.2 to 2.0 mm.

The restricting member 40 includes a plate-shaped spring seat 41 disposed between the valve body 23 and the valve spring 25 so as to be slidable in the large-diameter hole portion 16a of the valve fitting hole 16. The spring seat 41 stops by abutting a shoulder 16b at the top end of the large-diameter portion 16a, thereby restricting the moving distance a of the valve body 23 and thus the degree of opening of the valve.

As shown in FIGS. 7A and 7B, the spring seat 41 has a plurality of oil passages 42 in the form of cutouts formed along the outer periphery of the spring seat so as to be circumferentially spaced apart from each other. Each of the oil passages 42 has a sectional area of about 1 to 30% of the sectional area of the portion of the valve fitting hole 16 other than the large-diameter hole portion 16a. The spring seat 41 has on its bottom surface a seating portion 43 for the valve body 23. The seating portion 43 shown is a tapered recess.

The spring seat 41 may be formed by pressing a steel plate or formed from a synthetic resin. Its wall thickness is determined taking into consideration e.g. its material, strength and slide guiding properties, and is preferably within the range of 0.3 to 5 mm.

If the spring seat 41 is formed by pressing a steel plate, the steel plate is subjected to surface hardening treatment after pressing to increase its hardness. Suitable surface hardening treatment includes soft nitriding treatment and carbonitriding treatment.

If the spring seat 41 is formed from resin, a high-strength resin should be chosen. High-strength resins include glass fiber-reinforced polyamide and carbon fiber-reinforced polyamide.

In the relief valve 20 shown in FIGS. 7A and 7B, when the valve hole 22 is opened by the valve body 23, the spring seat 41 is pushed by the valve body 23 and slides upward until it stops by abutting the shoulder 16b at the top end of the large-diameter hole portion 16a. In this state, the spring seat 41 restricts the moving distance of the valve body and thus the degree of opening of the valve.

When the movement of the valve body 23 is restricted by the spring seat 41, the valve body 23 is spaced from the bottom opening of the communication passage 17. Thus, the bottom opening of the communication passage 17 will never be closed by the valve body 23. This ensures accurate performance of the relief valve 20 at all times.

As shown in FIG. 7(A), by forming the seating portion 43 for the valve body 23 on the bottom surface of the spring seat 41, the valve body 23 is prevented from radial movement. This makes it possible to reliably open and close the valve hole 22 with the valve body 23.

FIGS. 8 to 12 show different spring seats 41, all formed with oil passages 42 and a seating portion 43. In FIGS. 8A and 8B, the seating portion 43 is a hole having a diameter smaller than the diameter of the (spherical) valve body 23.

In FIGS. 9A and 9B, the seating portion 43 is a hole having a diameter smaller than the diameter of the valve body 23, and the oil passages 42 are elongated through holes radially extending from the seating portion 43.

Figure 10:
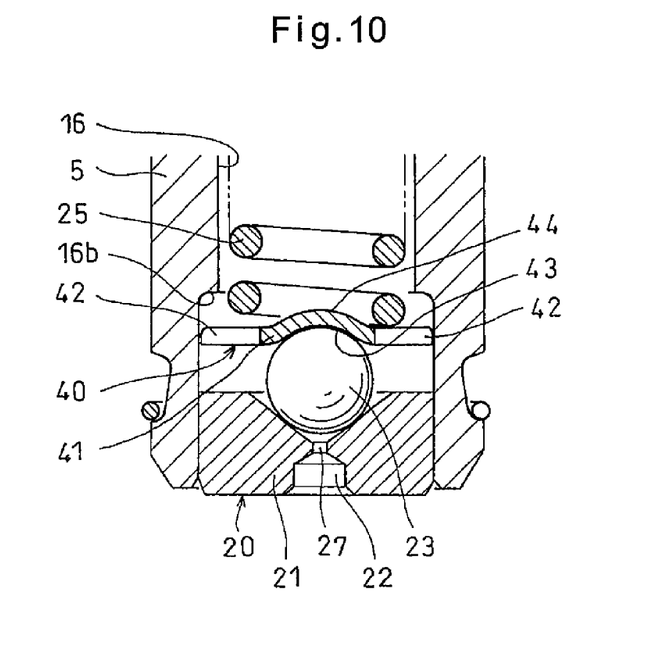
FIG. 10 is a sectional view of and around a further different spring seat.
Figure 11:
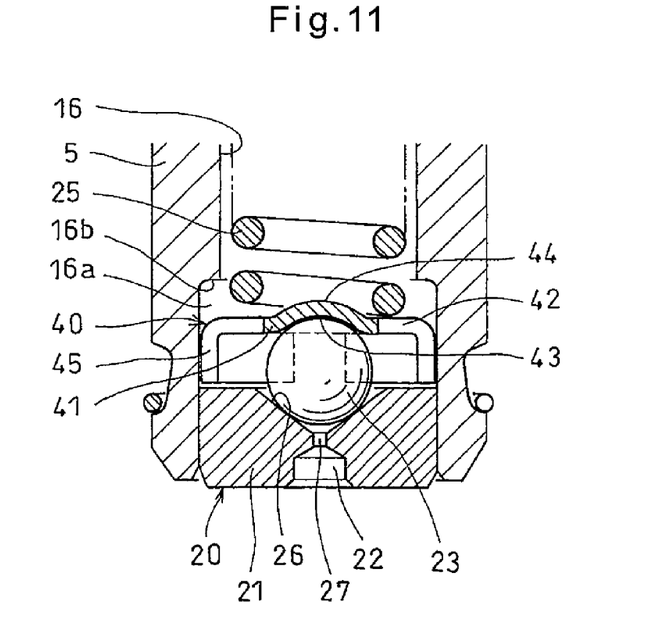
FIG. 11 is a sectional view of and around a further different spring seat.
Figure 12:
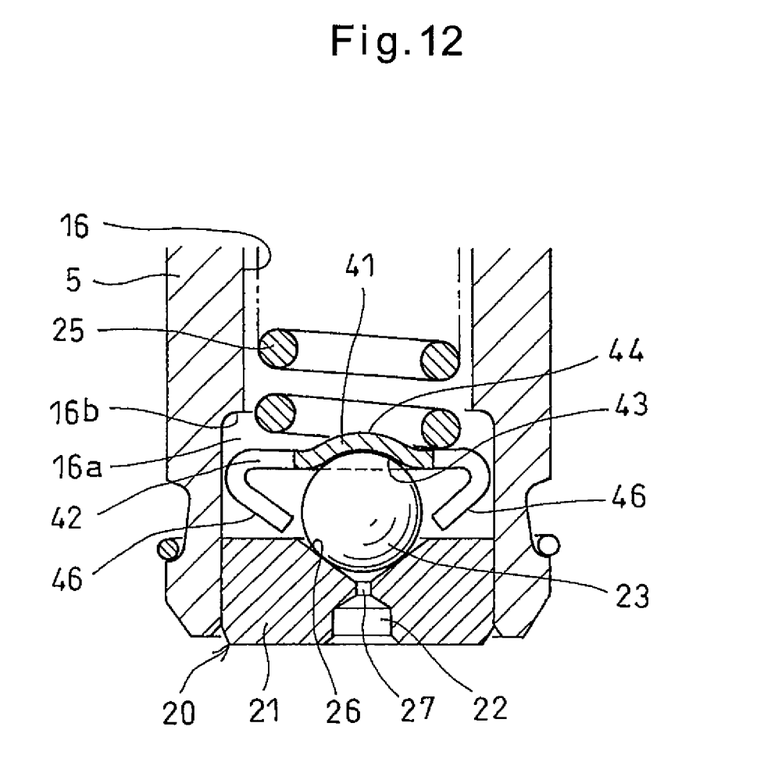
FIG. 12 is a sectional view of and around a further different spring seat.

In each of FIGS. 10 to 12, the spring seat 41 is formed by pressing a steel plate. The seating portion 43 is a spherical recess formed on the bottom surface of the spring seat 41 by pressing the bottom surface of the spring seat 41 so as to cover the outer periphery of the valve body 23. When forming the spherical recess by pressing, a bulge 44 simultaneously forms on the top surface of the spring seat 41.

The bulge 44 fits in the bottom end portion of the valve spring 25, preventing run-out of the bottom end portion of the valve spring 25. This ensures that the elastic force of the valve spring 25 is reliably applied to the spring seat 41 in the axial direction of the spring seat 41, which in turn makes it possible to smoothly slide the spring seat 41 in the axial direction at all times.

In FIG. 11, the spring seat 41 has circular arc-shaped guide pieces 45 formed by bending the spring seat 41 to extend downwardly from the outer peripheral portion of the spring seat 41 such that the guide pieces 45 are slidably guided by the radially inner surface of the large-diameter hole portion 16a. This makes it possible to smoothly slide the spring seat 41 along the radially inner surface of the large-diameter hole portion 16a.

In FIG. 12, the spring seat 41 has a plurality of retaining pieces 46 formed by downwardly bending the outer peripheral portion of the spring seat 41 by more than 90° such that the distal ends of the retaining pieces 46 face the outer spherical surface of the valve body with a minute gap left therebetween. With this arrangement, the retaining pieces 46 prevent radial movement of the valve body 23, making it possible for the valve body 23 to open and close the valve hole 22 with high accuracy.

DESCRIPTION OF THE NUMERALS

1. Cylinder
2. Coupling piece
3. Sleeve fitting hole
4. Sleeve
5. Rod
6. Pressure chamber
7. Spring support
8. Return spring
9. Coupling piece
10. Inner tubular portion
11. Outer tubular portion
12. Elastic seal
13. Reservoir chamber
14. Passage
15. Check valve
16. Valve fitting hole
16a. Large-diameter hole portion
16b. Shoulder
17. Communication passage
20. Relief valve
21. Valve seat
22. Valve hole
22a. Top end wall
22b. Inner surface
23. Valve body 24. Spring seat
24a. Rod
24b. Seating portion
25. Valve spring
26. Seating surface
27. Orifice
28. Minute gap
29. Curved portion
30. Recess
31. Bottom surface
40. Restricting means for restricting the degree of opening of the valve
41. Seat member
42. Oil passage
43. Seating portion
44. Bulge
45. Guide piece
46. Retaining piece

What is claimed is:

1. A hydraulic auto-tensioner comprising:
  a cylinder containing hydraulic oil and having an inner bottom surface formed with a sleeve fitting hole,
  a sleeve having a bottom end portion fitted in the sleeve fitting hole,
  a rod having a bottom end portion slidably inserted in the sleeve so as to define a pressure chamber in the sleeve,
  a spring support provided at an upper portion of the rod,
  a return spring mounted between the spring support and the inner bottom surface of the cylinder and configured to bias the cylinder and the rod in a direction in which the rod protrudes from the cylinder, a reservoir chamber having a top opening being defined between the cylinder and the sleeve, with the top opening of the reservoir chamber closed, a passage being defined between fitting surfaces of the sleeve and the sleeve fitting hole such that the reservoir chamber communicates with the pressure chamber through the passage,
  a check valve mounted in the passage and configured to close the passage when a pressure in the pressure chamber exceeds a pressure in the reservoir chamber, the rod being formed with a valve fitting hole having an opening at a bottom end surface of the rod, the rod further being formed with a communication passage through which an upper portion of the valve fitting hole communicates with the reservoir chamber, and
  a relief valve mounted in the valve fitting hole and configured to be opened if the pressure in the pressure chamber exceeds a set pressure so as to release the pressure in the pressure chamber into the reservoir chamber through the communication passage formed in the rod, the relief valve including:
    a valve seat press-fitted in the valve fitting hole and formed with a valve hole,
    a spherical valve body configured to open and close the valve hole from inside the valve fitting hole, wherein the valve body has an outer diameter D, and the orifice has an inner diameter d, and wherein the outer diameter D and the inner diameter d satisfy a relation d=0.05 D to 0.25 D, and
    a valve spring biasing the valve body toward the valve hole,
  wherein the valve seat is formed with an orifice disposed between the valve hole and a seating surface formed on an upper portion of the valve seat such that the valve body can be seated on the seating surface, the orifice being configured to restrict an amount of oil that passes through the valve hole; and
  wherein the seating surface is a tapered surface inclined at an angle of 25° to 85° relative to a center axis of the tapered surface.

2. The hydraulic auto-tensioner of claim 1, wherein the seating surface has a contact portion to be brought into contact with the valve body, wherein the contact portion is a curved portion having a convex curved section having a radius of curvature of 1 mm to 7 mm.

3. The hydraulic auto-tensioner of claim 1, wherein the valve hole has an inner surface formed as a vertical mirror image of the seating surface.

4. The hydraulic auto-tensioner of claim 1, wherein the seating surface has a convex circular arc-shaped section having a radius of curvature of not more than 1 mm.

5. The hydraulic auto-tensioner of claim 1, wherein the valve fitting hole has a large-diameter hole portion at a bottom end portion of the valve fitting hole, the valve seat being press-fitted in the large-diameter hole portion, the relief valve further including a spring seat mounted in the large-diameter hole portion so as to be slidable along a radially inner surface of the large-diameter hole portion, a shoulder being formed at a top end of the large-diameter hole portion, the shoulder and the spring seat being arranged such that the shoulder restricts a movement of the spring seat by abutting the spring seat, and the spring seat restricts a movement of the valve body so as to restrict a degree of opening of the relief valve, and the spring seat being formed with an oil passage through which oil can flow from a bottom surface of the spring seat to a top surface of the spring seat.

6. A hydraulic auto-tensioner comprising:
  a cylinder containing hydraulic oil and having an inner bottom surface formed with a sleeve fitting hole,
  a sleeve having a bottom end portion fitted in the sleeve fitting hole,
  a rod having a bottom end portion slidably inserted in the sleeve so as to define a pressure chamber in the sleeve,
  a spring support provided at an upper portion of the rod,
  a return spring mounted between the spring support and the inner bottom surface of the cylinder and configured to bias the cylinder and the rod in a direction in which the rod protrudes from the cylinder, a reservoir chamber having a top opening being defined between the cylinder and the sleeve, with the top opening of the reservoir chamber closed, a passage being defined between fitting surfaces of the sleeve and the sleeve fitting hole such that the reservoir chamber communicates with the pressure chamber through the passage,
  a check valve mounted in the passage and configured to close the passage when a pressure in the pressure chamber exceeds a pressure in the reservoir chamber, the rod being formed with a valve fitting hole having an opening at a bottom end surface of the rod, the rod further being formed with a communication passage through which an upper portion of the valve fitting hole communicates with the reservoir chamber, and
  a relief valve mounted in the valve fitting hole and configured to be opened if the pressure in the pressure chamber exceeds a set pressure so as to release the pressure in the pressure chamber into the reservoir chamber through the communication passage formed in the rod, the relief valve including:
    a valve seat press-fitted in the valve fitting hole and formed with a valve hole,
    a spherical valve body configured to open and close the valve hole from inside the valve fitting hole, and a valve spring biasing the valve body toward the valve hole, wherein the valve seat is formed with an orifice disposed between the valve hole and a seating surface formed on an upper portion of the valve seat such that the valve body can be seated on the seating surface, the orifice being configured to restrict an amount of oil that passes through the valve hole; and wherein the valve body has an outer diameter D, and the orifice has an inner diameter d, and the outer diameter D and the inner diameter d satisfy a relation d=0.05 D to 0.25 D.

7. The hydraulic auto-tensioner of claim 6, wherein the valve fitting hole has a large-diameter hole portion at a bottom end portion of the valve fitting hole, the valve seat being press-fitted in the large-diameter hole portion, the relief valve further including a spring seat mounted in the large-diameter hole portion so as to be slidable along a radially inner surface of the large-diameter hole portion, a shoulder being formed at a top end of the large-diameter hole portion, the shoulder and the spring seat being arranged such that the shoulder restricts a movement of the spring seat by abutting the spring seat, and the spring seat restricts a movement of the valve body so as to restrict a degree of opening of the relief valve, and the spring seat being formed with an oil passage through which oil can flow from a bottom surface of the spring seat to a top surface of the spring seat.

8. A hydraulic auto-tensioner comprising:
a cylinder containing hydraulic oil and having an inner bottom surface formed with a sleeve fitting hole,
a sleeve having a bottom end portion fitted in the sleeve fitting hole,
a rod having a bottom end portion slidably inserted in the sleeve so as to define a pressure chamber in the sleeve,
a spring support provided at an upper portion of the rod,
a return spring mounted between the spring support and the inner bottom surface of the cylinder and configured to bias the cylinder and the rod in a direction in which the rod protrudes from the cylinder, a reservoir chamber having a top opening being defined between the cylinder and the sleeve, with the top opening of the reservoir chamber closed, a passage being defined between fitting surfaces of the sleeve and the sleeve fitting hole such that the reservoir chamber communicates with the pressure chamber through the passage,
a check valve mounted in the passage and configured to close the passage when a pressure in the pressure chamber exceeds a pressure in the reservoir chamber, the rod being formed with a valve fitting hole having an opening at a bottom end surface of the rod, the rod further being formed with a communication passage through which an upper portion of the valve fitting hole communicates with the reservoir chamber, and
a relief valve mounted in the valve fitting hole and configured to be opened if the pressure in the pressure chamber exceeds a set pressure so as to release the pressure in the pressure chamber into the reservoir chamber through the communication passage formed in the rod, the relief valve including:

a valve seat press-fitted in the valve fitting hole and formed with a valve hole, a spherical valve body configured to open and close the valve hole from inside the valve fitting hole, and a valve spring biasing the valve body toward the valve hole, wherein the valve seat is formed with an orifice disposed between the valve hole and a seating surface formed on an upper portion of the valve seat such that the valve body can be seated on the seating surface, the orifice being configured to restrict an amount of oil that passes through the valve hole; and wherein the valve fitting hole has a large-diameter hole portion at a bottom end portion of the valve fitting hole, the valve seat being press-fitted in the large-diameter hole portion, the relief valve further including a spring seat mounted in the large-diameter hole portion so as to be slidable along a radially inner surface of the large-diameter hole portion, a shoulder being formed at a top end of the large-diameter hole portion, the shoulder and the spring seat being arranged such that the shoulder restricts a movement of the spring seat by abutting the spring seat, and the spring seat restricts a movement of the valve body so as to restrict a degree of opening of the relief valve, and the spring seat being formed with an oil passage through which oil can flow from a bottom surface of the spring seat to a top surface of the spring seat.

9. The hydraulic auto-tensioner of claim 8, wherein the bottom surface of the spring seat faces the valve body, and the spring seat having on the bottom surface thereof a seating portion configured to prevent radial movement of the valve body.

10. The hydraulic auto-tensioner of claim 8, wherein the spring seat has on the top surface thereof a bulge which fits in a bottom end portion of the valve spring and prevents run-out of the bottom end portion of the valve spring.

11. The hydraulic auto-tensioner of claim 8, wherein the oil passage is one of a cutout formed on an outer peripheral portion of the spring seat, or a through hole extending through the spring seat from the top surface of the spring seat to the bottom surface of the spring seat.

12. The hydraulic auto-tensioner of claim 8, wherein the spring seat has a guide piece extending downwardly from an outer peripheral portion of the spring seat so as to be guided by the radially inner surface of the large-diameter hole portion.

13. The hydraulic auto-tensioner of claim 8, wherein the spring seat is formed of a pressed metal plate.

14. The hydraulic auto-tensioner of claim 13, wherein the valve body has a spherical outer surface, and the spring seat has a plurality of retaining pieces downwardly bent by more than 90° such that distal ends of the retaining pieces face the spherical outer surface of the valve body with a gap between each of the distal ends and the spherical outer surface.

15. The hydraulic auto-tensioner of claim 8, wherein a degree of opening of the valve body is set within a range of 0.2 mm to 2.0 mm.

* * * * *